United States Patent [19]

Hsu

[11] Patent Number: 5,929,579
[45] Date of Patent: Jul. 27, 1999

[54] SOFT-COMMUTATED DIRECT CURRENT MOTOR

[75] Inventor: John S. Hsu, Oak Ridge, Tenn.

[73] Assignee: Lockheed Martin Energy Research, Oak Ridge, Tenn.

[21] Appl. No.: 09/100,628

[22] Filed: Jun. 19, 1998

Related U.S. Application Data

[60] Provisional application No. 60/079,861, Mar. 30, 1998.

[51] Int. Cl.$^6$ ..................................... H10R 39/46
[52] U.S. Cl. ........................ 318/439; 318/541; 318/542; 310/219; 310/220
[58] Field of Search ..................... 318/439, 541, 318/542; 310/223, 148, 219, 220, 238, 228, 224

[56] References Cited

U.S. PATENT DOCUMENTS

| | | |
|---|---|---|
| 3,497,788 | 2/1970 | Kerrigan et al. .................... 318/541 |
| 3,733,506 | 5/1973 | Jaffe et al. ............................ 310/198 |
| 4,270,065 | 5/1981 | Major .................................... 310/207 |
| 4,425,536 | 1/1984 | Larsen .................................. 318/439 |
| 4,479,079 | 10/1984 | Hanner ................................ 318/541 |
| 4,760,318 | 7/1988 | Jones ................................... 318/541 |
| 4,831,295 | 5/1989 | Posedel ............................... 310/221 |

*Primary Examiner*—William M. Shoop, Jr.
*Assistant Examiner*—Rita Leykin
*Attorney, Agent, or Firm*—Quarles & Brady LLP

[57] ABSTRACT

A method and circuit is disclosed for soft-commutation of a direct current (DC) motor. An attenuation circuit is connected through auxiliary brushes A, A', B and B' to the commutator (16) to drain circuit from successive armature coils (15) before the main brushes (27, 28) disconnects from each of the coils (15). This prevents the spark generation that normally occurs in conventional DC motors. The attenuation circuit may also be connected before energization of the coil (15) for a soft turning on operation.

18 Claims, 4 Drawing Sheets

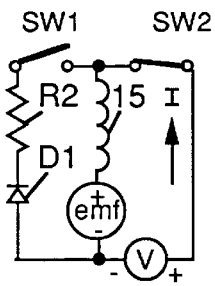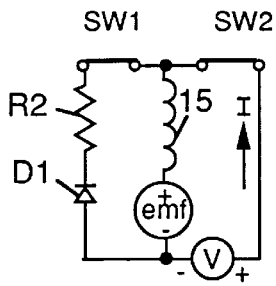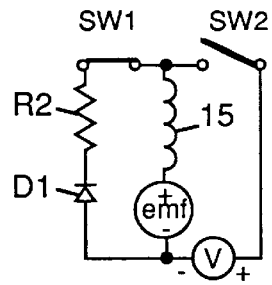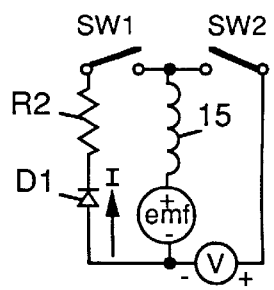
Fig. 5a  Fig. 5b  Fig. 5c  Fig. 5d
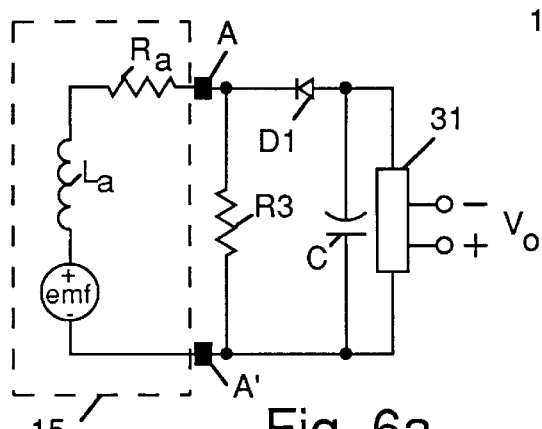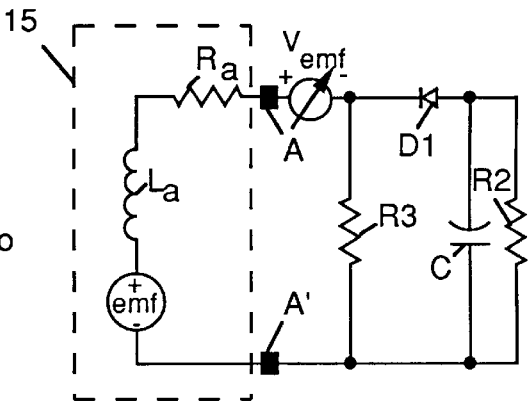
Fig. 6a  Fig. 6b
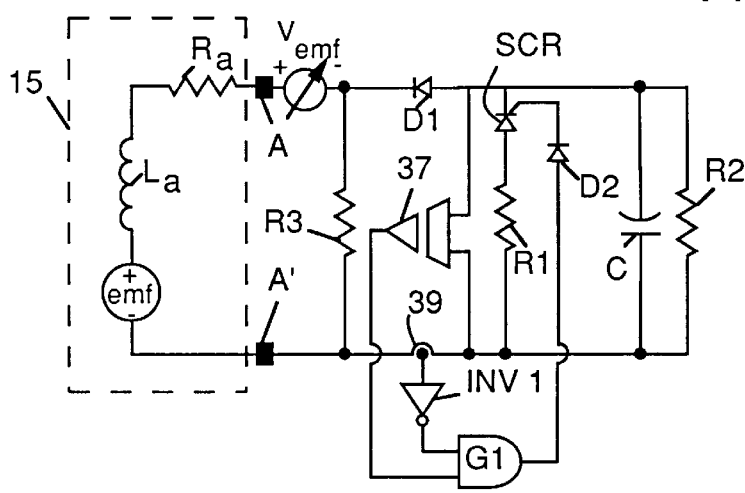
Fig. 6c

SOFT-COMMUTATED DIRECT CURRENT MOTOR

CROSS REFERENCE TO RELATED APPLICATIONS

The benefit of the earlier filing date of Provisional Application No. 60/079,861, filed Mar.30, 1998, is claimed herein.

STATEMENT REGARDING FEDERALLY SPONSORED RESEARCH

This invention was made with Government support under Contract No. DE-AC05-96OR22464 awarded by the U.S. Dept. of Energy. The Government has certain rights in the invention.

TECHNICAL FIELD

The field of the invention is DC motors and generators and control circuits for DC motors and generators.

BACKGROUND ART

DC motors having brushes and commutators have been long known in art, but are still capable of significant improvement. Commutation in a conventional DC motor occurs when a brush provides a short circuit between two ends of an individual motor coil. Prior to commutation, current is flowing through coils lying on one side of the brush in one direction, and current is flowing through coils lying on an opposite side of the brush in the reverse direction. After commutation, current flows in an opposite direction through the commutated coil. To ensure good commutation, current density in the brush at the beginning and the end of commutation should be low, and the voltage difference between the brush and the commutator segment should also be low. However, even with linearly decreasing current during commutation, the energy associated with the residual current must be dissipated before the current can reverse. The commutator and brushes act as a heat sink to absorb this energy, and this provides the high temperature that shortens the life of the brushes. Typical commutation can produce sparks or flashovers, where large currents are rapidly discharged between partially contacting contact surfaces.

Nevertheless, commutation in brush-type DC motors has cost and design advantages when compared to the electronic commutation utilized by brushless motors. For consumer products, such as electric vehicle motors, a long brush life expectancy will attract consumers to choose a low-cost brush-type motor that does not require a costly inverter.

SUMMARY OF THE INVENTION

The invention relates to a method and circuit for soft-commutation of a direct current (DC) machine. An attenuation circuit is connected through a pair of auxiliary brushes to drain current from the armature coil before a main brush disconnects from the coil. This prevents the generation of sparks that can occur in conventional DC machine. As used herein, the term "DC machine" shall include both DC motors and DC generators.

The invention is also applied to soft-commutation during initial energization or turning on of a motor coil.

The invention is preferably applied in a motor in which the armature coils have been connected in parallel. This allows individual coils to be soft-commutated.

The invention provides a two-dimensional flux path which allows a smaller structure than a homopolar motor. Voltages can be higher and currents can be lower than those of a homopolar motor.

With the invention, the energy associated with the residual current of the commutated coils is dissipated through an attenuation circuit. This energy can also be recycled back to the DC supply.

Unlike a conventional DC motor, the commutator and brushes of the soft-commutated DC motor are not used as a heat sink to absorb the energy associated with the residual current. The commutation of the coils can be controlled independently.

Other objects and advantages, besides those discussed above, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention and, therefore, reference is made to the following claims which follow the description for determining the scope of the invention.

BRIEF DESCRIPTION OF THE DRAWINGS

FIGS. 5a–5d are schematic diagrams of a simplified functional circuit for explaining the method and operation of the present invention; and FIGS. 6a–6c illustrate three specific embodiments of attenuation circuits according to the present invention.

DETAILED DESCRIPTION OF THE PREFERRED EMBODIMENTS

Figure 1:
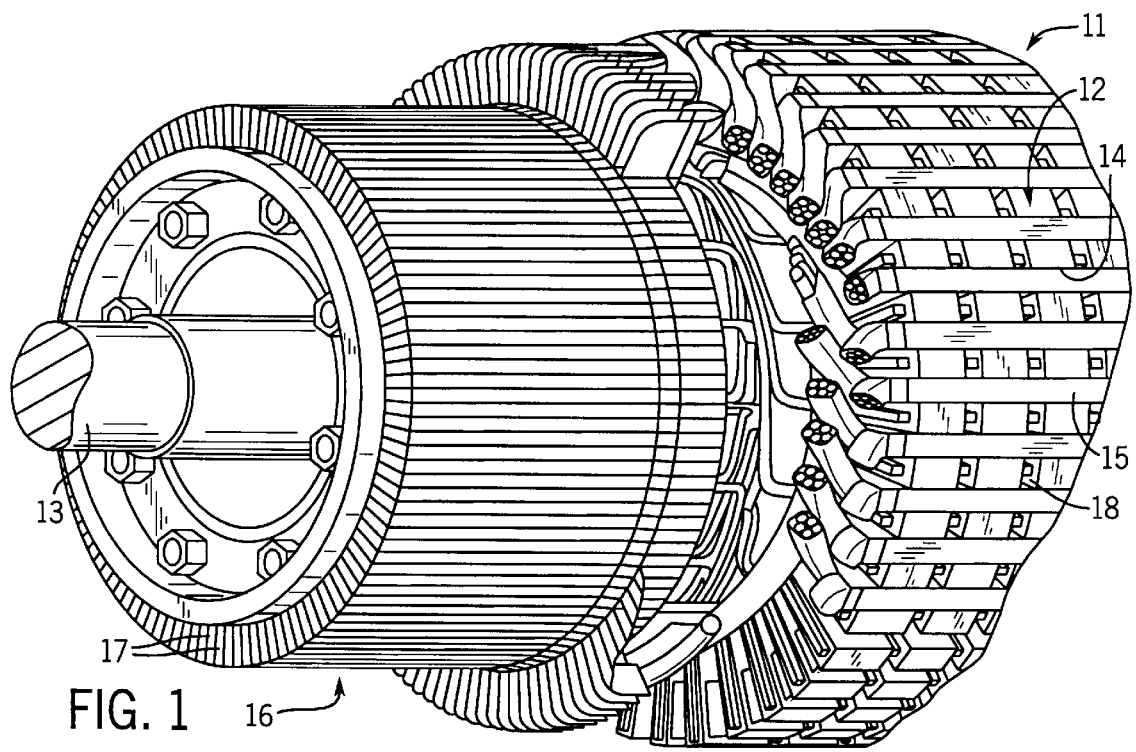
FIG. 1 is a perspective view of a rotor from a DC commutated motor.

FIG. 1 illustrates a rotor 11 of a DC motor. The rotor 11 has an armature core 12 which rotates around an output shaft 13 to provide mechanical output power to drive a piece of apparatus. The armature core 12 is formed of laminations and is formed with a plurality of slots 14, not be confused with vents 18, which are also shown in FIG. 1. Coils 15 are positioned in the slots 14 and have termination ends which connect to respective commutator segments 17 in a commutator ring 16 disposed around the shaft 13.

Figure 2:
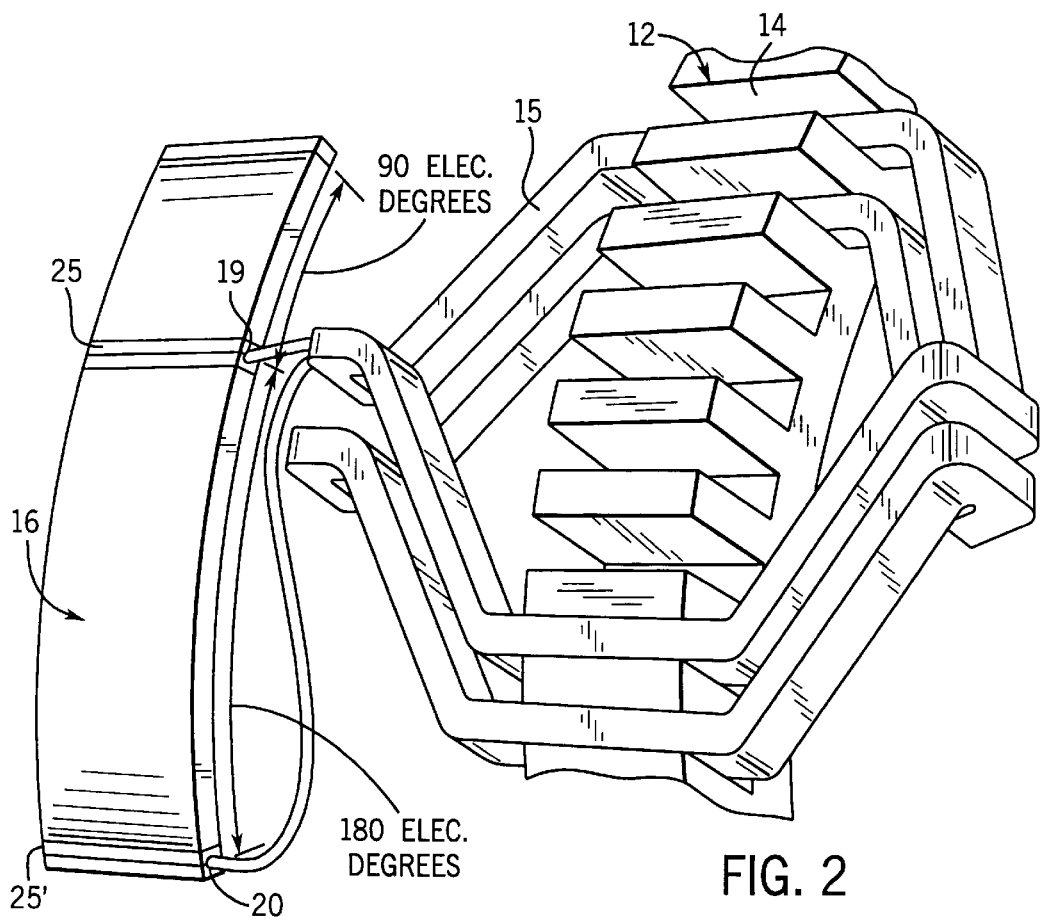
FIG. 2 is a perspective view in detail of a portion of the rotor of FIG. 1.

As seen in FIG. 2, a coil 15 having a pitch of seven slots has a first portion positioned in "slot 1" and a second portion positioned in "slot 7". The length of the armature 12 has been shortened to one lamination stack in FIG. 2 for the purpose of viewing a complete coil 15. There may be a number of turns of a conductor in each coil 15, but one termination end 19 of the conductor connects to a first pair of conductive commutator segments 25 and a second termination end 20 of the conductor connects to a second pair of commutator segments 25'.

The DC motor in this example is a four-pole motor, so the angular mechanical distance of 360 degrees around the motor shaft 13 translates to a corresponding number of electrical degrees according to the following expression:

$$\text{Electrical degrees} = 360° \times \frac{\text{No. of Poles}}{2} \qquad 1)$$

Because the DC motor 11 in this example is a 4-pole motor, the result of applying the above expression is that there are a total of 720 electrical degrees, or 360 electrical degrees per pole pair. In FIG. 2, "slot 1" is displaced ninety electrical degrees from the termination end 19. Termination ends 19 and 20 are separated by 180 electrical degrees.

Figure 3:
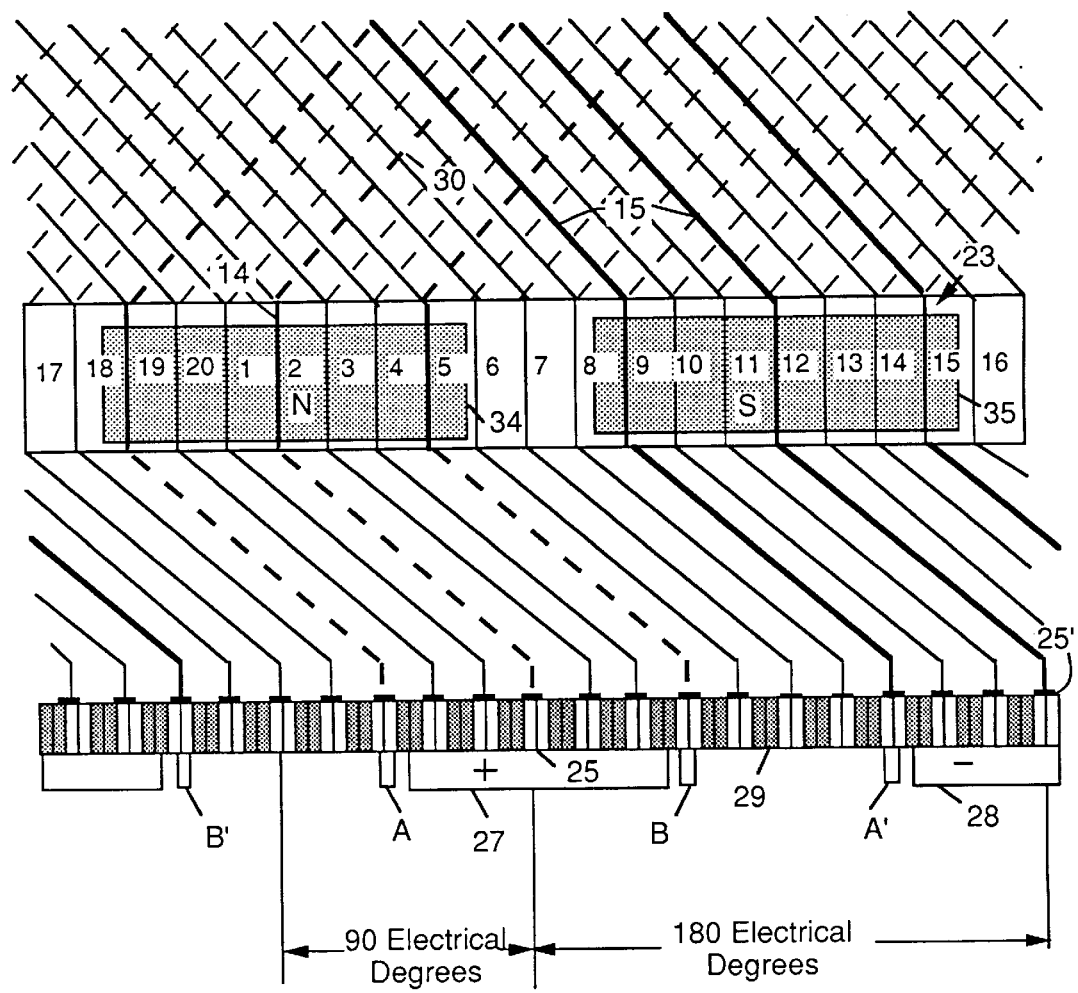
FIG. 3 is a schematic view of a motor for carrying out the invention.

FIG. 3 is a 2-dimensional schematic view of a portion of the motor similar which generally corresponds to the portion of the motor seen in FIG. 2, with the exception that the coil pitch is eleven slots (1–11) of the armature 23. One of the coils 15 has a first portion running through "slot 1" and then continuing as a dashed line to a first pair of commutator segments 25 and a second portion running through "slot 11" to another pair of commutator segments 25' displaced 180 electrical degrees from the first pair 25. Although the commutator segments are arranged in pairs in the preferred embodiment, such segments could be made as individual segments of double width. The thick line segments 30 above the armature "slots 1–20" represent the portion of the coil 15 wound on other parts of the armature 23. The motor has a total of twenty double-layer, full-pitch coils 15. The solid lines angled to the left (above armature 23) represent one layer of coils 15, while the dashed lines angled to the right represent a second layer of coils 15 underneath the layer represented by the solid lines. A similar arrangement would exist between armature 23 and the commutator segments 25, 29, but only one layer of coils 15 represented by solid lines has been shown in this area.

The number of turns per coil 15 is forty-eight (48) turns which provides for a lower terminal voltage of seventy-two (72) volts. The center of a slot (slot 1, for example) is displaced an angular distance corresponding to ninety (90) electrical degrees from the corresponding center of one pair of commutator segments 25 to which one termination end of the coil 15 is electrically connected. The center line of a main (+) brush 27 is located below "slot 6". In FIG. 3, the positions of one pair of N-S poles 34, 35 are illustrated relative to the armature slots 14. The main (+) brush 27 has its centerline aligned with a space between the N-S poles 34, 35. The centerline of the main (−) brush 28 would also be positioned between the S pole and N pole of the next pair of N-S poles.

In FIG. 3 pairs of metal conducting commutator segments 25 are unshaded and are alternated with pairs of non-conducting segments 29 which are shaded in gray. Alternatively, the non-conducting segments 29 can be made of the same metal as the conducting segments 25 but with more than one small segment to prevent the re-energizing of a coil 15 after its current has been attenuated during commutation. However, for purposes of the following explanation, the non-conducting segments 29 will be used.

Still referring to FIG. 3, a first pair of auxiliary, soft-commutation brushes A and A' are spaced a distance corresponding to 180 electrical degrees to connect to an individual motor coil 15. In this example, they are connected to a coil running through "slot 18" and "through slot 8." A second pair of soft-commutation brushes B and B' are also spaced apart a distance corresponding to 180 electrical degrees to connect to an individual motor coil 15, in this case a coil 15 running through "slot 4" and through "slot 14". In addition, brushes B and B' are displaced from brushes A and A', so that as one coil 15 is being soft-commutated by brushes B and B', a second coil 15 is being soft-commutated in an opposite direction of current flow by brushes A and A'.

The main brushes 27, 28 are arranged in two sections of a ring marked with + and − signs to designate relative polarity. The coils 15 are connected in parallel to the main brushes 27, 28. When the main brushes 27, 28, slide out of contact with an individual coil 15 such as the coil through slot 4 and slot 14, this individual coil can be soft-commutated through brushes B and B'. The coils 15 (slots 4 and 14, slots 18 and 8) that are being soft-commutated in FIG. 3 are still positioned under the N-S poles for cutting the air gap flux.

The distance between the main brush 27, 28 and the soft-commutation brushes, A, A', B and B', is approximately 1.5 times the width of the individual commutator segments 25, 29. The width of the commutation brush is also approximately 1.5 times the width of the individual commutator segments.

The main brushes 27, 28 and related commutator segments correspond to the switch SW2, shown in FIGS. 5a–5d. The auxiliary brush A, A', B and B' and related commutator segments correspond to the switch SW1.

The two phases of soft commutation are: 1) the attenuation of the residual coil current and 2) the building up of coil current when the coil is initially connected to the DC supply V (FIGS. 5a–5d) through the contact of commutator segments 25 and main brushes 27, 28. The objective of attenuation is to drain the residual current of the coil 15 that is being commutated before the coil 15 is open circuited by disconnection from one of the main brushes 27, 28. The potential difference across the switching contacts should be as low as possible. Various attenuation circuits can be used to carry out this method.

The basic method of soft commutation is illustrated in a series of FIGS. 5a–5d. In FIG. 5a, a DC supply voltage, V, under a normal operating conditions overcomes the back "emf" and resistance voltage drop of the coil 15 and results in a load current (I) flowing through switch SW2 and motor coil 15. Resistance R2 and diode D1 form an attenuation circuit of the present invention, but as shown in FIG. 5a, it is not connected through switch SW1 to the motor coil 15. If the switch SW2 were opened in FIG. 5a with the load current (I) present, a spark may be generated to release the energy ($\frac{1}{2} LI^2$) stored in the coil 15.

To overcome this problem, an attenuation circuit R2, D1 is connected through switch SW1 to the motor coil 15, before SW2 is opened. The attenuation circuit may be designed to feed back to the supply voltage source V or to simply drain the energy from the coil 15. A diode D1 is connected in series as a part of the attenuation circuit to prevent unwanted current flow.

FIG. 5b shows that when the coil 15 is about to be commutated, the switch SW1 is closed. The diode D1 blocks current flow in the attenuation circuit. FIG. 5c shows that when the switch SW2 is opened, the residual current in the coil 15 is not forced through the gap of the switch SW2 to cause a spark. Instead, the residual current flows through the attenuation circuit, which can be viewed as a variable impedance. The initial impedance value changes for a sufficiently short attenuation of the current. Finally, when the residual coil current is drained, switch SW2 is opened (FIG. 5c) and the potential difference across SW1 is small. Lastly, switch SW1 is opened, which represents the electrical disconnection of one pair of the soft-commutation brushes A and A', or B and B'. The switching-off of a soft commutation is thus accomplished.

FIG. 5c also illustrates a turning on operation, when steady state current has not been flowing in the motor. The attenuation circuit is connected through switch SW1 before switch SW2 is closed. The attenuation circuit of the left-hand side does not draw any current when switch SW2 is closed. The coil has a back emf that is close to the DC supply voltage V. The coil current (I) rises from zero according to the inductance (L) of the coil 15 and becomes stable according to the following expression:

$$I = \frac{(V - emf)}{R_A} \qquad 2)$$

where $R_A$ is the resistance of the coil 15. Because the inductance (L) of the coil 15 slows the rise time of the current (I), the turning-on can be characterized as a soft turning on. The soft turning on is another phase of soft commutation. After SW2 is closed and the motor has reached steady state operation, SW1 can be opened (FIG. 5a) until it is next desired to commutate the winding.

Figure 4A:
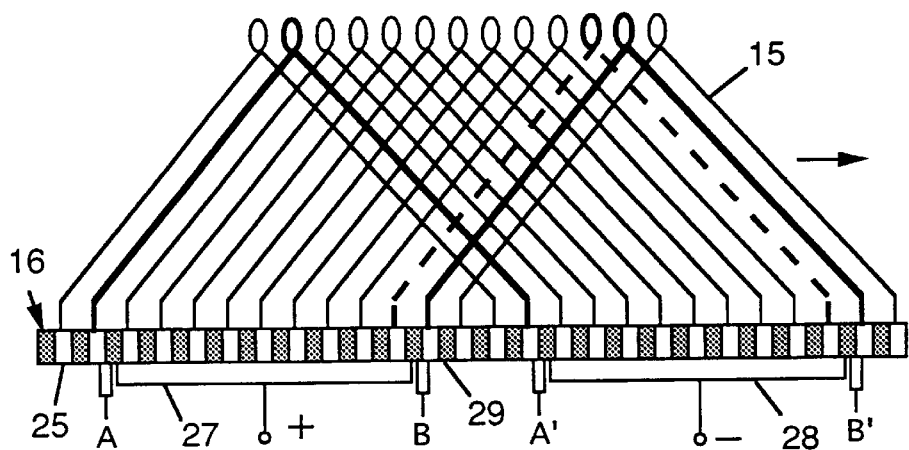
FIGS. 4a–4c are schematic diagrams illustrating commutation of a motor according to the present invention.
Figure 4B:
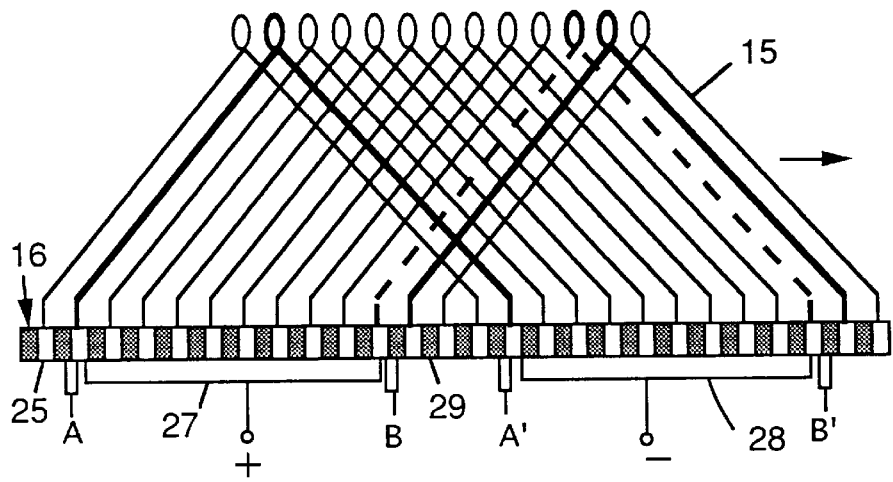
Figure 4C:
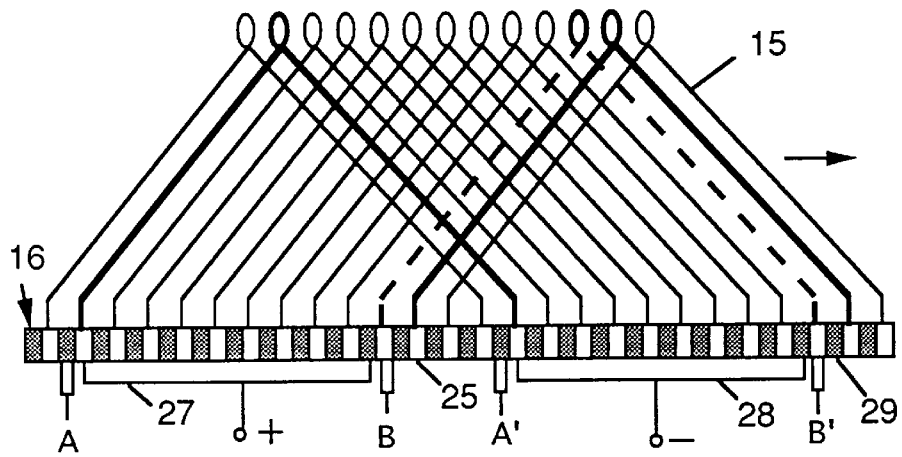

FIGS. 4a–4c illustrate how the armature coils are connected in parallel to the brushes 27, 28. Since this is a two-dimensional representation of a three-dimensional rotating machine, the rotation of the coils 15 and the commutator 16 relative to the brushes 27, 28, A, A', B and B is represented by the arrow in FIGS. 4a–4c. As the coils 15 and the commutator 16 of the rotor 11 move, the relative positions between brushes 27, 28, A, A', B and B and commutator segments 25, 29 change. FIG. 4a shows the coils in thick solid lines are connected to the commutation brushes, A, A', B and B, respectively. The main brushes 27, 28 are electrically isolated from the two coils connected to the commutation brushes A, A', B and B. This is the same operating state as shown in FIG. 5c with switch SW1 closed, and with switch SW2 open. The dashed-line coil 15 is connected to the main brushes only. This is the same operating state as shown in FIG. 5a, where switch SW1 is open and switch SW2 is closed.

FIG. 4b shows that the coil 15 represented by the thick solid line originally connected to B, B', is not connected to any brush. This corresponds to the operating state shown in FIG. 5d. The coil 15 represented by the dashed line in FIG. 4b connects to both the main brushes 27, 28 and the commutation brushes, B, B'. This corresponds to the operating state shown in FIG. 5b. The coil 15 represented by the thick solid line on the left-hand side starts its connection to the main brushes 27, 28. This corresponds to the "turning on" operating state.

FIG. 4c shows that the dashed-line coil 15 connects to the commutation brushes, B, B'. The main brushes 27, 28 are not connected to the coil 15. This corresponds to the situation shown in FIG. 5c. The thick solid-line coil 15 on the left-hand side is continuously connected to the main brushes 27, 28. FIGS. 4a–4c show how a motor is soft commutated according to the circuit schematics seen in FIGS. 5a–5d.

A simplest form of attenuation circuit is shown in FIG. 6a. All forms of the attenuation circuit connect to the soft-commutation brushes A, A', B and B' and are mounted external to the rotor 11. In the circuit in FIG. 6a, the coil 15 can be represented electrically as having an inductance $L_A$, a resistance $R_A$ and a coil emf induced by the field-pole magnetic flux. The coil 15 has a residual current, I, that is drained before the coil's commutation segments 25 (FIG. 3) slide away from the soft-commutation brushes A, A'.

In FIG. 6a, the energy associated with the initial residual current is transferred primarily to the capacitor C. From capacitor C it may be dissipated through a resistor R2 (as seen in FIGS. 5a–5d, 6b and 6c) or using a circuit known as a buck-boost converter 31 in place of resistance R2 in FIG. 6a, current can be recycled back to a source of DC voltage for the motor. The buck-boost converter circuit 31 is a circuit of a type well known in the art of power electronics in which energy is stored in an inductor in circuit 31 during commutation, and then transferred in the form of an output voltage, $V_o$, using a capacitor and resistor, each in parallel to the inductor. A diode blocks current to the capacitor and resistor during the phase will energy is being stored in the inductor.

When current in a coil 15 is received and dissipated, the voltage across the soft-commutation brushes A, A', may be quite different from the voltage across the capacitor C. This may cause an undesired voltage differential at the time when the coil's commutation segments 25 (FIG. 3) slide away from the soft-commutation brushes A, A'.

FIG. 6b shows a second embodiment of an attenuation circuit in which the above voltage differential is reduced by introducing an adjustable potential, $V_{emf}$, between the capacitor voltage and the coil voltage. For example, this may be provided by an adjustable AC voltage source having a secondary connected to a full bridge diode circuit. The magnitude of $V_{emf}$ is slightly lower than the coil's back emf and this prevents any unwanted current flow. The attenuation of the residual coil current may take a longer time as compared with the circuit in FIG. 6a.

FIG. 6c shows a third embodiment of an attenuation circuit in which this longer attenuation time can be reduced by introducing a rapid discharge. The coil 15 is again operated with an inductance $L_A$, resistance $R_A$ and a coil emf induced by the field-pole magnetic flux. A silicon controlled rectifier SCR is connected in series with a resistance R1 in a branch of the circuit that connects across the soft-commutation brushes A, A', for example. An isolated voltage transducer 37 is also connected to sense the voltage across the soft-commutation brushes A, A'. The output of this transducer connects to one input of AND gate G1. An isolated current sensor 39 is connected to sense current from the brushes A, A'. The sensor 39 is connected through an inverter INV 1 to another input of the AND gate G1. The output of the AND gate G1 is connected through a diode D2 to a gate on the SCR. Resistance R2 and capacitor C are connected as they were in FIGS. 6a and 6b. The variable $V_{emf}$ is also connected in the circuit.

When the attenuation circuit is connected to the coil 15, the capacitor is charged to dissipate current in the coil. When capacitor voltage is high across the capacitor, C, and current is low enough to indicate attenuation of current in the coil 15 as sensed by sensor 39, the AND gate will be enabled, and the gate of the SCR will be enabled to fire the SCR. This will allow rapid discharge of the capacitor C through resistor R1 to ready the attenuation circuit to absorb current from the next motor coil. The permissible upper speed limit of the soft-commutated motor is affected by the time required by the soft-commutation. The soft commutation must be completed between the time the commutation brush contacts and leaves an active commutator segment.

A prototype motor was constructed according to the present invention using a General Electric, 5-horsepower, 1750/2400 rpm, 240-volt, shunt wound DC motor. The motor had two main field poles and two compoles. The compoles were removed, and the air gap of the main poles was machined to make the gap uniform for the prototype motor. A shim was placed in the back of each pole to make the new air gap 1.65 mm (0.065") per side which is the same as the old gap measured at the pole center. The bore diameter is 120.9 mm (4.760"), and the core length is 152.4 mm (6").

As an example, a prototype motor had twenty armature slots and eighty commutator bars. Two coil layers were in each slot. The armature had a total of 20 coils with each coil having 48 turns. The coil pitch was 1–11 slots. The connection of the coils 15 to the commutator segments was as shown in FIG. 3. The prototype motor also had a compensating winding that is commonly known for compensation for reactance of the armature.

The prototype motor started and ran smoothly. The concept of dynamically connecting the armature coils in parallel through the main brushes was demonstrated. No sparks were noticeable with a simple commutation circuit similar to that shown in FIG. 6a connected to each pair of the commutation brushes.

This has been a description of several preferred embodiments of the invention. Various modifications will be apparent to those of ordinary skill in the art and these are intended to be practiced without departing from the scope of the invention. For example, the invention has been disclosed in a DC motor embodiment, it can be applied to commutate coils in a DC generator. Therefore, reference is made to the claims which follow for defining the legal scope of the invention.

I claim:

1. A method for soft commutation of a brush-type DC machine, having a plurality of armature coils, having a commutator and having at least two main brushes, the method comprising:

making an electrical connection between two additional brushes and one of the armature coils before said one of the armature coils is disconnected from at least one of the main brushes; and receiving and dissipating current from said one of the armature coils before said one of the armature coils is electrically disconnected from at least one of the main brushes.

2. The method of claim 1, wherein the armature coils are connected in parallel, such that the electrical connection between the two additional brushes and said one of the armature coils are made in parallel to other of said armature coils.

3. The method of claim 1 or 2, further comprising providing a voltage in opposition to an electromotive force induced in said one of said armature coils to reduce a voltage differential across the additional brushes.

4. The method of claim 3, further comprising:

sensing the voltage differential across the additional brushes;

wherein current is received and applied to charge a capacitor in an attenuation circuit;

sensing the current flow in the attenuation circuit; and triggering a rapid discharge of the capacitor in response to sensing the voltage differential to be not greater than a predetermined threshold and in response to sensing current in the attenuation circuit to be not greater than a predetermined threshold.

5. The method of claim 1 or 2, further comprising:

making an electrical connection between another two additional brushes and a second one of the armature coils before said second one of the armature coils is disconnected from a second one of the main brushes; and receiving and dissipating current from said second one of the armature coils before said second one of the armature coils is electrically disconnected from at least one of the main brushes.

6. The method of claim 5, wherein the first-mentioned making of an electrical connection and the second-mentioned making of an electrical connection are made simultaneously.

7. The method of claim 1 or 2, wherein receiving and dissipating the current includes storing energy from said one of the armature coils for recycling to a supply of DC voltage for the DC machine.

8. The method of claim 1 or 2, further comprising connecting an attenuation circuit to said one of the armature coils through two additional brushes before electrically connecting said one of the armature coils to a supply of DC voltage through the main brushes.

9. A circuit for soft commutation of brush-type DC machine, having a plurality of armature coils, having a commutator and having at least two main brushes, the circuit comprising:

at least two additional brushes positioned to make an electrical connection to one of the armature coils before said one of the armature coils is electrically disconnected from at least one of said main brushes; and an attenuation circuit for receiving and dissipating current resulting from the electrical connection of the two additional brushes to one of the armature coils before said one of the armature coils is electrically disconnected from at least one of said main brushes.

10. The circuit of claim 9, wherein said plurality of armature coils are connected in parallel when connected through said main brushes; and wherein said one of the armature coils connected to the two additional brushes is connected to said main brushes and said two additional brushes in parallel to a subset of said plurality of said armature coils.

11. The circuit of claim 9 or 10, further comprising:

at least another two additional brushes positioned to make an electrical connection to a second one of the armature coils before said second one of the armature coils is electrically disconnected from a second one of said main brushes; and a second attenuation circuit for receiving and dissipating current resulting from the electrical connection of the other two additional brushes to said second one of the armature coils before said second one of the armature coils is electrically disconnected from said second one of the main brushes.

12. The circuit of claim 11, wherein the first-mentioned making of an electrical connection and the second-mentioned making of an electrical connection are made simultaneously.

13. The circuit of claim 9 or 10, wherein the two additional brushes are positioned on opposite sides of one of the two main brushes for electrical connection to one of the armature coils before said one of the armature coils is electrically disconnected from at least one of said main brushes.

14. The circuit of claim 9 or 10, wherein the attenuation circuit includes a capacitor for receiving current from said one of the armature coils when electrically connected to the additional brushes.

15. The circuit of claim 9 or 10, wherein the attenuation circuit includes a means for producing a voltage in opposition to an electromotive force induced in said one of the armature coils to provide a voltage differential.

16. The circuit of claim 15, wherein the attenuation circuit includes a subcircuit for discharging the capacitor in response to sensing a voltage differential to be not greater than a predetermined threshold and in response to sensing current in the attenuation circuit to be not greater than a predetermined threshold.

17. The circuit of claim 9 or 10, wherein the attenuation circuit includes a subcircuit for recycling current from said one of the armature coils to a supply of DC voltage for the DC machine.

18. The circuit of claim 9 or 10, wherein said attenuation circuit is positioned for electrical connection to said one of the armature coils through said two additional brushes before said one of the armature coils is electrically connected to a supply of DC voltage through the main brushes.

* * * * *

UNITED STATES PATENT AND TRADEMARK OFFICE
CERTIFICATE OF CORRECTION

Patent No.  : 5,929,579
Dated       : July 27, 1999
Inventor    : Hsu

It is certified that error appears in the above-identified patent and that said Letters Patent is hereby corrected as shown below:

In column 2, line 49, "not be confused with" should be --not to be confused with--.

In column 4, line 37, "under a normal operating" should be --under normal operating--.

In column 3, equation 1, "Electricaldegrees" should be --Electrical degrees--.

In column 5, lines 25, 28, 31 and 33, "A, A', B and B should be --A, A', B and B'--.

In column 6, line 10, "will" should be --while--.

Signed and Sealed this

Third Day of April, 2001

Attest:

NICHOLAS P. GODICI

Attesting Officer

Acting Director of the United States Patent and Trademark Office